United States Patent
Doo et al.

(10) Patent No.: US 7,134,017 B2
(45) Date of Patent: Nov. 7, 2006

(54) METHOD FOR PROVIDING A TRUSTED PATH BETWEEN A CLIENT AND A SYSTEM

(75) Inventors: So-Young Doo, Daejeon (KR); Sung Kyong Un, Daejeon (KR); Jong-Gook Ko, Dajeon (KR); Jeong Nyeo Kim, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 890 days.

(21) Appl. No.: 10/187,340

(22) Filed: Jul. 2, 2002

(65) Prior Publication Data

US 2003/0097572 A1    May 22, 2003

(30) Foreign Application Priority Data

Nov. 21, 2001    (KR) ............................... 2001-72639

(51) Int. Cl.
*G06F 9/00* (2006.01)
(52) U.S. Cl. ...................................... 713/168; 713/182
(58) Field of Classification Search ................. 713/168, 713/182, 200, 201
See application file for complete search history.

(56) References Cited

U.S. PATENT DOCUMENTS

| | | | | |
|---|---|---|---|---|
| 5,659,616 A | * | 8/1997 | Sudia | ........................... 705/76 |
| 5,892,904 A | * | 4/1999 | Atkinson et al. | ............. 726/22 |
| 6,202,157 B1 | * | 3/2001 | Brownlie et al. | .............. 726/1 |
| 6,320,948 B1 | * | 11/2001 | Heilmann et al. | .......... 379/189 |
| 6,353,886 B1 | * | 3/2002 | Howard et al. | ............. 713/156 |

OTHER PUBLICATIONS

Silmon Wiseman, Phil Terry, Andrew Wood and Clare Harrold; *The Trusted Path between SMITE and the User*; Royal Signals and Rader Establishment; CH2558-5/88/0000/0147; British Crown; 1988; pp. 147-155.

* cited by examiner

*Primary Examiner*—Thomas R. Peeso
(74) *Attorney, Agent, or Firm*—Mayer, Brown, Rowe & Maw LLP

(57) ABSTRACT

Disclosed herein is a method of providing a trusted path between a client and a system using an access control processing technique. The method of providing a trusted path between a client and a system includes the step of determining whether access to resources of the system will be permitted or refused on the basis of access control rules and databased attributes set by a security administrator. Thereafter, the client is notified of permission for or refusal of the access in accordance with the result of the determination.

3 Claims, 3 Drawing Sheets

US 7,134,017 B2

METHOD FOR PROVIDING A TRUSTED PATH BETWEEN A CLIENT AND A SYSTEM

FIELD OF THE INVENTION

The present invention relates to an authentication technique between a client and a system; and, particularly, to a method for providing a trusted path between a client and a system, which provides the client accessing the system with a trusted login path, and employs an access control processing technique suitable for authenticating the client using an enhanced authentication technique.

BACKGROUND OF THE INVENTION

Currently, with the rapid popularization of the Internet and the everyday use of computers, a variety of techniques for enhancing client authentication have been applied to computer networks.

Of those techniques, an authentication technique, in which a smart card and a password are combined together, for example, a magnetic card and a password are used to authenticate a user of an automated teller machine of a bank, is representative. Aside from the above-described authentication technique using the magnetic card, there are widely utilized hardware authentication techniques, such as fingerprint, iris, voice and image identification techniques.

Such client authentication techniques using hardware have an authentication enhancing effect in that the complexity of the authentication is increased. In order to provide more secure authentication, a smart card, which can provide a challenge-response method, is most suitable.

Alternatively, there are proposed a one-time password generation technique that changes a password whenever a client accesses a system so as to prevent the leakage of the password, and an automatic password generation technique that generates a random value in a system. However, these technologies are not widely utilized because of the inconvenience of memorizing a changed password every time.

In the other respect, when a client is authenticated in a password authentication system used for a general UNIX-based system, there may occur information leakage in which, for example, information such as a password is stolen by a third party without a client's knowledge.

That is, a counterfeit login program is executed without a client's knowledge, intercepts the password of the client and outputs a message to show that the client has inputted his password erroneously and a message to request a client to try again (in this case, the outputted message has the same format as a message to request a client to try again in the genuine login program, so the client is cheated by the message and responds to the try-again request). The client authentication is carried out while the genuine login program is executed. While the client inputs the password, a third party can obtain important information such as the password by monitoring the processing of a current process.

As a result, in a client authentication system, the necessity for the provision of a trusted path is increased.

The trusted path plays an important role in an authentication process, which allows a system to confirm that a message is generated by a client and allows information inputted by the client to be transmitted only to the system. The representative example of an authentication technology for providing a trusted path is found in a Microsoft Windows NT login program.

In the above authentication program, while a system is operated, a trusted path is provided with all the other processes being stopped. However, it can be inefficient to stop all the other processes whenever a login program is executed in a system in which a plurality of clients share a variety of resources.

Additionally, in the conventional login program providing a trusted path, there is not provided a technical means and method for determining whether a login program being executed is a normal login program, so there occurs a problem that a highly trusted path is not provided.

SUMMARY OF THE INVENTION

Accordingly, the present invention has been made keeping in mind the above problems occurring in the prior art, and an object of the present invention is to provide a method of providing a trusted path between a client and a system using an access control processing technique, in which a role based access control processing function is added to a kernel region to determine whether access to the resources of the system is permitted or refused on the basis of access control rules and databased attributes (for example, read, write, execute, inherit, etc.), and login roles are granted to a login program and a smart card processing function to allow a password input process to be carried out only when a login is permitted (when an indicator light of a card reader is turned on), thereby maximizing the provision of the trusted path.

In order to accomplish the above object, the present invention provides a method of providing a trusted path between a client and a system using an access control processing technique, comprising the steps of: determining whether access to resources of the system will be permitted or refused on the basis of access control rules and databased attributes set by a security administrator; and notifying the client of permission for or refusal of the access in accordance with the result of the determination.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, with reference to the accompanying drawings, a method for providing a trusted path between a client and a system is described in detail.

The gist of the present invention is to provide a trusted path for preventing information inputted in the process of client authentication, important information alternation and information processing from leaking to third parties, and add a role based access control module to a kernel so as to control hardware using the access control module, thus allowing the object of the present invention to be easily accomplished.

That is, the present invention is based on a client authentication system, in which a role based access control processing function is added to a kernel to allow a request for access to all the resources (for example, processes, files, devices, etc.) of a system to be received by an access control processing unit, and the access processing unit processes the request for access and transmits the result of the access control processing to the module having requested the access control processing. In this case, subjects (clients or processes) accessing the system are previously granted roles by the access control administrator, and values set regarding these roles are stored in a security database (DB) for storing subject IDs and one or more roles allocated to the subjects. Additionally, objects (files, devices, etc.) are granted roles by an access control administrator, and this information is stored in the security DB. That is, access control rules and the contents of the security DB can be set by the owners of objects (files, devices, etc.) and a security administrator only.

Additionally, the present invention is characterized in that a security administrator grants an attribute "login role" to a genuine login program newly fabricated by modifying a login program and a hardware driver (in this embodiment, a smart card reader equipped with an on-off light). Accordingly, a process executing the genuine login program also possesses the login role. Only a process possessing the login role can read the items stored in a smart card.

Figure 1:
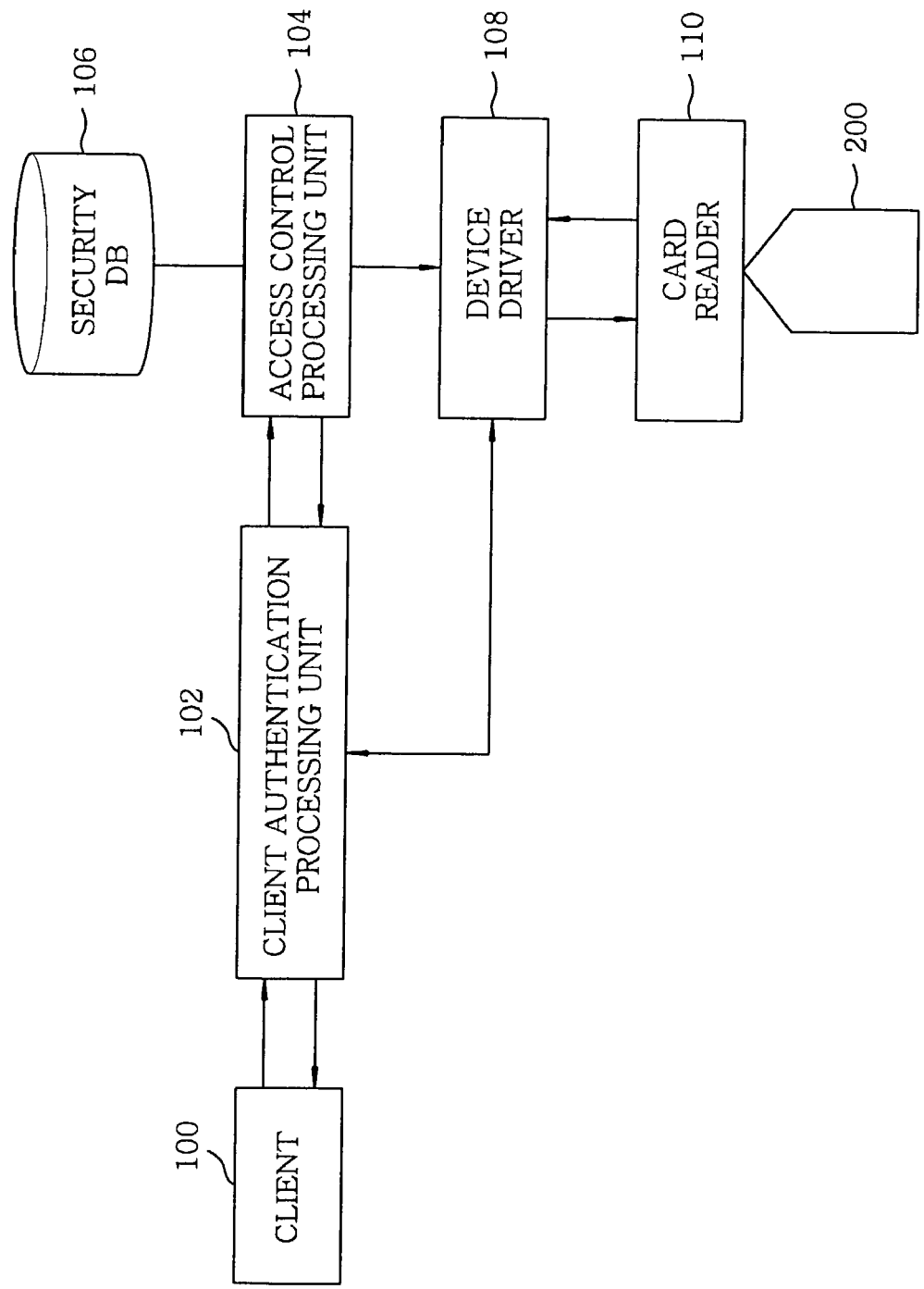
FIG. 1 is a block diagram showing a client authentication system for implementing a method of providing a trusted path between a client and a system in accordance with the present invention.

FIG. 1 is a block diagram showing a configuration of a client authentication system for implementing the method of providing a trusted path between a client and a system. This system includes a client 100, a client authentication processing unit 102, an access control processing unit 104, a security database (DB) 106, a device driver 108, a card reader 110, and a smart card 200.

The client 100 refers to a user who accesses a computer system or server, or user terminal. The client 100 functions as a subject who inputs client information such as an identification or a password to the client authentication processing unit 102.

The client authentication processing unit 102 functions to transmit client information inputted from the client 100 to the access control processing unit 104 situated in a kernel region. That is, the client authentication processing unit 102 functions to transmit an access control determination request message inputted from the client 100. Additionally, the client authentication processing unit 102 executes a corresponding shell when receiving an access permission message, but displays an error message on the display of the client 100 to notify the client of the occurrence of an error when the error occurs.

The access control processing unit 104 functions to compare items inputted by the client 100 with items stored in the security DB 106, determine whether the access of the client 100 is permitted, and retransmit the result of the determination to the client authentication unit 102. That is, the access control processing unit 104 determines whether a request coincides with the preset contents of the security DB whenever the client 100 accesses system resources and information.

In resource access control provided in conventional UNIX-based systems, different access authorities are granted to the owners of resources, groups and the other clients. The access authority is usually specified as a read, write, or execute authority. General system resources are classified into resources available to the public and resources available to super clients or a system manager only.

In the present invention, the access control processing unit 104, which is applied to a role-based access control technology, is implemented to be operated in a kernel. That is, resource access and execution can be carried out after permission is obtained from the access control processing unit 104. The control of access to a resource can be set by the owner of the resource or an access control administrator only.

Referring back to FIG. 1, the smart card reader 110 is connected to the serial port device driver 108. To be used for the performance of a login operation, the serial port device driver 108 is granted a login role.

The grant of roles is performed by the access control processing unit 104. That is, differently from the conventional UNIX-based systems, the system of the present invention allows even the super client to operate in conjunction with such setting. The setting of the access control cannot be changed by the authority of the super client.

The serial port device driver 108 is granted a login role, such as read, write, or execute, by the access control processing unit 104, so only a process having a login role is granted authority to access the serial port device driver 108 and perform read, write, or execute.

Additionally, the access control processing unit 104 grants a login role, that is, a read, write, execute, or inherit role, to a login program. The reason for the inclusion of the additional role "inherit" is that a login role is granted to a process executing the program.

When the login program is executed, the client authentication system is operated, thereby allowing a client authentication process described above and shown in FIG. 2 to be carried out.

The access control processing unit 104 grants a login role to a login execution file with a further smart card processing function. Its attributes are specified as "read, write, execute, inherit" and stored in the security DB 106. Additionally, a device (file) connected to the smart card reader 110 and corresponding to a serial port is granted a login role.

Figure 2:
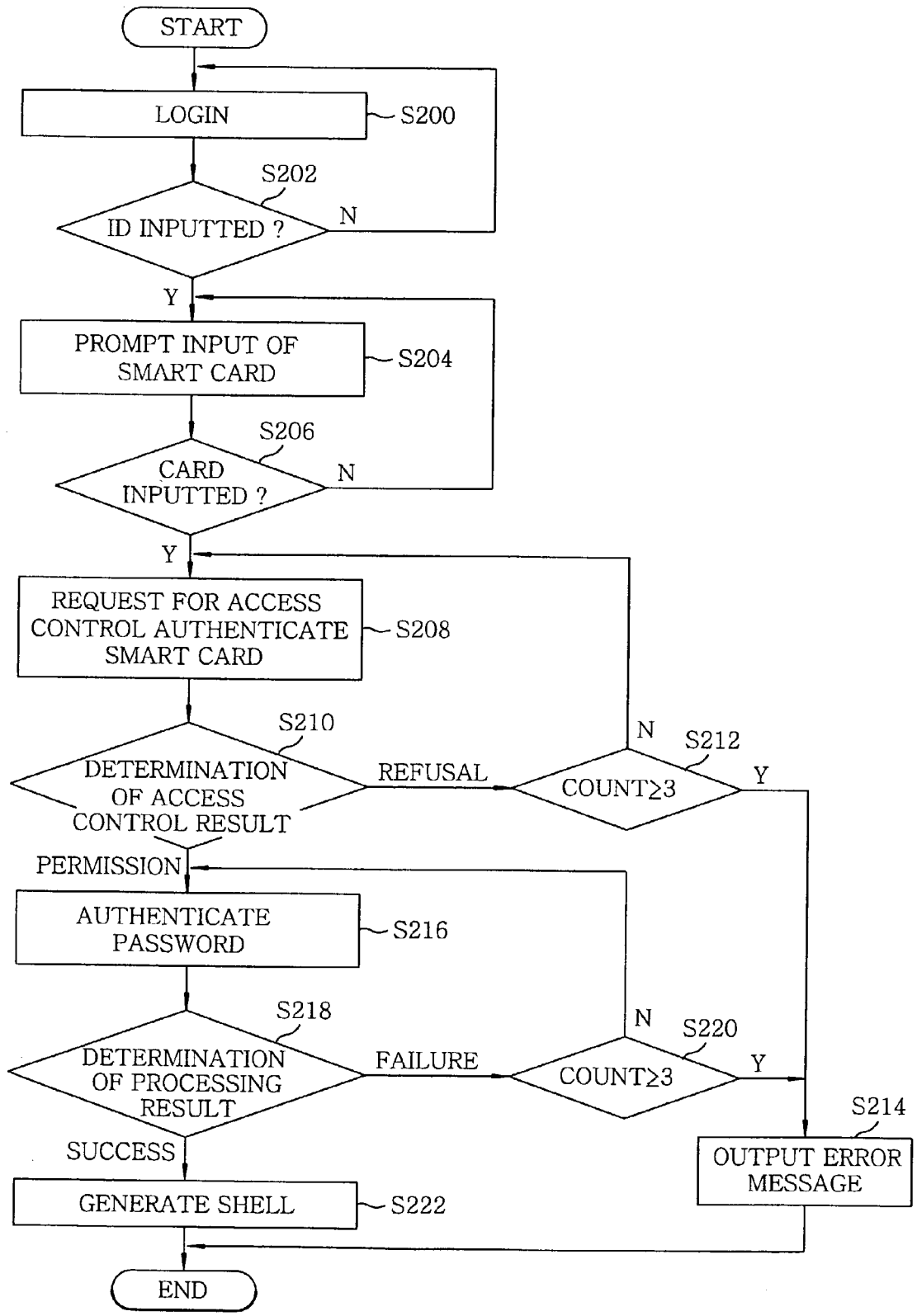
FIG. 2 shows a flowchart showing a client authentication process in which a trusted path is provided in accordance with an embodiment of the present invention.

Hereinafter, a client authentication process in accordance with an embodiment of the present invention is described in detail with reference to FIG. 2.

First of all, when the program is executed, the client 100 receives a command "login" at S200.

At step S202, the client authentication processing unit 102 determines whether an ID granted thereto by the system is inputted. If the ID is inputted, the process proceeds to step S204 at which the input of the smart card is prompted. At step S204, a command "input the smart card" is displayed on the client terminal 100.

At step S206, the client authentication processing unit 102 determines whether the smart card 200 is inserted by the client 100. If the smart card 200 is inserted, the process proceeds to step S208 at which access control is requested from the access control processing unit 104 and the smart card authentication is carried out.

At step S210, the result of access control according to the smart card authentication is evaluated.

The card reader 110 applied to the present embodiment is provided with an on-off light (not shown). If the client 100 inserts the smart card 200, the on-off light of the smart card reader 110 can be turned on. This can be implemented using a command for turning on power that is one of commands defined in International Standards Organization (ISO) standards.

In this case, if the on-off light is not turned on, it may be determined that the command is not transmitted from a normal login program. The card reader 110 is granted a login role by the access control processing unit 104 and a current process executing a login program is granted a login role, so the current process can command the card reader 110 to be on. Although other programs can show the client 100 the same command through a screen as the login program, other programs cannot be granted login roles because the login roles can be granted by the access control processing unit 104 only. Accordingly, the client 100 can confirm that a message is transmitted from the system by the turning-on of the on-off light.

If the smart card 200 is not inserted within a certain period of time or is not a normal card, a certain number of trials, for example, three trials, are given at step S212.

In such a case, if errors occur three or more times, an error message is outputted to the client 100 and the program is ended at step S214.

If a normal card is inputted and a card key value stored in the normal card is read by the card reader 110, the process proceeds to step S216.

At step S216, a password authentication process is carried out. In this password authentication process, for example, a message "password" may be displayed on the client terminal. Such a password authentication process is the same as a general password authentication process. Accordingly, the detailed description of the password authentication is omitted, and will be easily understood by those skilled in the art.

If a certain password is inputted by the client 100, the process proceeds to step S218 at which the result of the processing is evaluated.

If as the result of the evaluation at step S218, the result of the processing is evaluated as an error, three trials are given at S220. If errors occur three or more times, the program is ended.

If as the result of the evaluation at step S218, the input of the password is evaluated as a success, the process proceeds to step S222 at which a shell is executed for the client 100 and the client 100 is allowed to use the system. In this case, the previously allocated login role is not inherited by the shell executed for the client 100.

Figure 3:
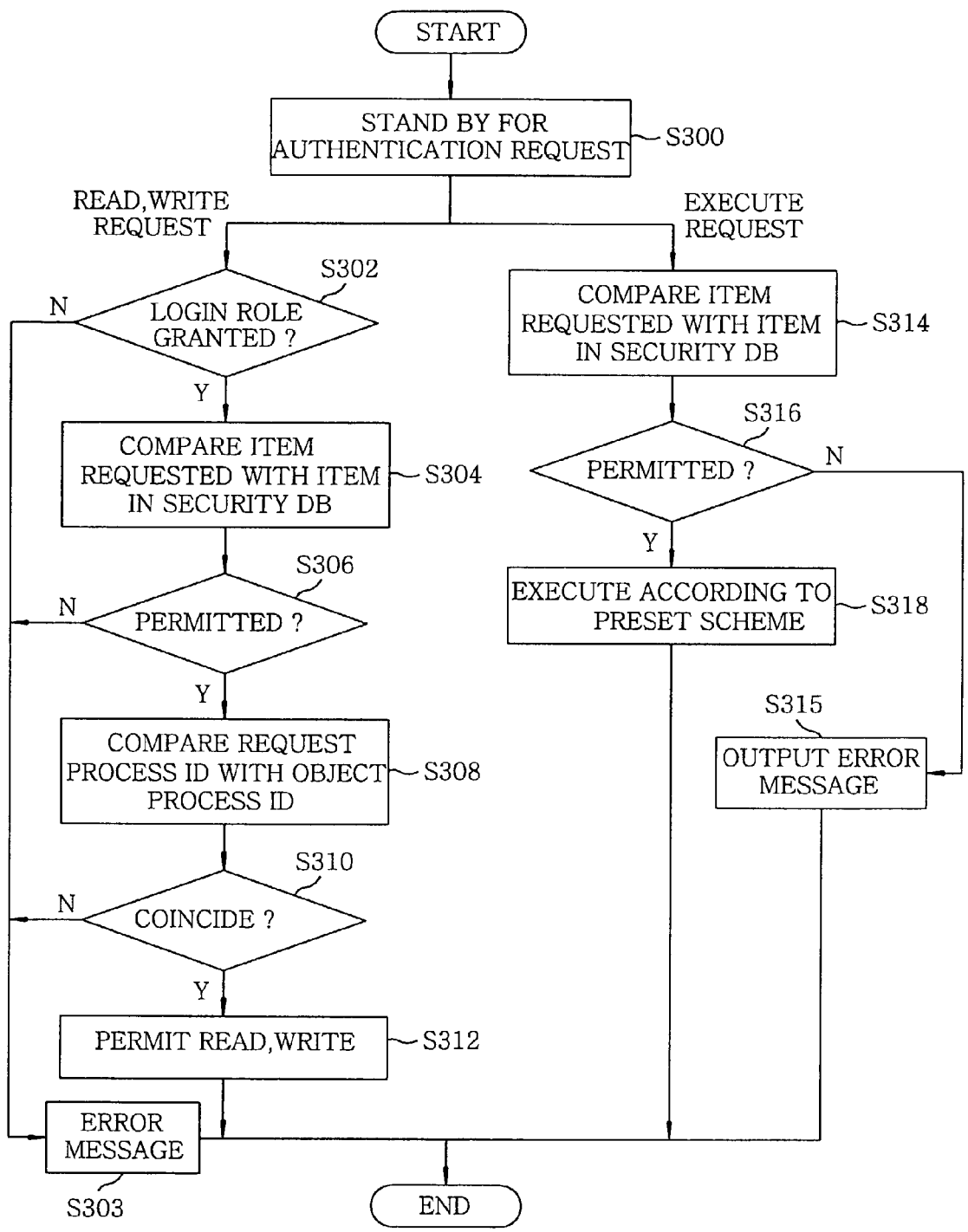
FIG. 3 represents a flowchart showing a role based access control process in accordance with another embodiment of the present invention.

FIG. 3 is a flowchart showing another role based access control process in accordance with another embodiment of the present invention.

At step 300, the access control processing unit 104 stands by for an authentication related request from the client 100. If the authentication related request is a read or write request, the process proceeds to step S302; while if the authentication related request is an execute request, the process proceeds to step S314.

At step S302, the access control processing unit 104 determines whether a login role is granted. As described above, the access control processing unit 104 grants a corresponding process a login role when the process executes a file to which a login role is granted. The process to which a login role is granted maintains the login role until the authentication process is terminated. When the authentication process is terminated, the login role is removed from the process.

If as the result of the determination as step S302, a login role is granted, the process proceeds to step S304 at which an item requested is compared with a corresponding, item stored in the security DB.

If the item requested coincides with the item stored in the security DB at step S306, the process proceeds to step S308 at which a request process ID is compared with an object process ID. If the item requested does not coincide with the item stored in the security DB, the process proceeds to step S303 at which an error message is issued and the corresponding request is rejected because the important information of the client 100, such as a password, may be leaked.

That is, in order to prevent a process from monitoring a currently executed process and intercepting the password of the client 100 while the client 100 inputs the password, that is, the login program is executed, this process authenticates the process ID and allows read or write only when the process ID is authenticated. As a result, the client 100 is provided with a trusted path while inputting a password.

As described above, the present invention provides a method, which can confirm that a command is transmitted from a system before a client transmits personal information to the system and prevent the important information of the client from leaking to third parties, so the reliability of client authentication is enhanced, thereby protecting system resources and preventing the information of the client from leaking.

While the invention has been shown and described with respect to the preferred embodiments, it will be understood by those skilled in the art that various changes and modifications may be made without departing from the spirit and scope of the invention as defined in the following claims.

What is claimed is:

1. A method for providing a trusted path between a client and a system using an access control processing technique, comprising the steps of:

determining whether access to resources of the system will be permitted or refused on the basis of access control rules and databased attributes set by a security administrator; and notifying the client of permission for or refusal of the access in accordance with the result of the determination, wherein in the step of notifying is implemented in such a way that certain hardware processing means connected to the outside through an external connection port is provided with a visible display function.

2. The method of claim 1, further comprising the steps of:

determining whether the hardware processing means and the client are each granted the login role if the client logs in and inputs an identification;

determining whether the access to the resources of the system is permitted or refused by authenticating the ID on the basis of the access control rules and the databased attributes if as the result of the determination, the hardware processing means and the client are each granted the login role;

turning on the display function of the hardware processing means if as the result of the determination, the access is permitted; and performing a password authentication process.

3. The method of claim 2, wherein if as the result of the determination, the access will be refused, a preset number of trials are allowed.

* * * * *